United States Patent
Wick

(10) Patent No.: US 8,213,585 B2
(45) Date of Patent: Jul. 3, 2012

(54) AUTOMATED DISTRIBUTION AND INDEXING OF PREPAID CALLING CARD INFORMATION

(75) Inventor: Corey W. Wick, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1183 days.

(21) Appl. No.: 12/027,481

(22) Filed: Feb. 7, 2008

(65) Prior Publication Data

US 2009/0202054 A1 Aug. 13, 2009

(51) Int. Cl.
*H04M 15/00* (2006.01)
*G07F 7/00* (2006.01)
*H04L 9/00* (2006.01)

(52) U.S. Cl. .......... 379/114.2; 235/380; 379/88.02; 379/114.23; 379/121.06; 379/142.02; 379/144.01; 455/406; 713/169

(58) Field of Classification Search .......... 235/380; 379/114.2, 121.06, 144.01, 114.23, 88.02, 379/142.02; 455/406; 713/169
See application file for complete search history.

(56) References Cited

U.S. PATENT DOCUMENTS

| | | | |
|---|---|---|---|
| 5,359,182 A | 10/1994 | Schilling | 235/380 |
| 5,621,787 A * | 4/1997 | McKoy et al. | 379/121.06 |
| 5,995,822 A * | 11/1999 | Smith et al. | 455/406 |
| 6,226,364 B1 * | 5/2001 | O'Neil | 379/114.2 |
| 6,285,749 B1 * | 9/2001 | Manto | 379/114.23 |
| 6,628,766 B1 * | 9/2003 | Hollis et al. | 379/114.2 |
| 6,785,372 B1 * | 8/2004 | Moss et al. | 379/114.2 |
| 6,999,569 B2 * | 2/2006 | Risafi et al. | 379/144.01 |
| 7,110,512 B2 * | 9/2006 | Maropis et al. | 379/114.2 |
| 7,123,703 B2 * | 10/2006 | Hausmann et al. | 379/114.2 |
| 7,156,300 B1 | 1/2007 | Dentlinger | 235/380 |
| 7,180,990 B1 * | 2/2007 | Henderson et al. | 379/114.2 |
| 7,248,855 B2 * | 7/2007 | Joyce et al. | 455/406 |
| 7,255,268 B2 * | 8/2007 | Dentlinger | 235/380 |
| 7,308,087 B2 * | 12/2007 | Joyce et al. | 379/114.2 |
| 7,664,242 B2 * | 2/2010 | Finkelman et al. | 379/142.02 |
| 7,734,919 B2 * | 6/2010 | Maeoka et al. | 713/169 |
| 7,945,033 B2 * | 5/2011 | Halford | 379/114.2 |
| 2001/0028705 A1 * | 10/2001 | Adams et al. | 379/114.2 |
| 2002/0163999 A1 * | 11/2002 | Farris et al. | 379/88.02 |
| 2009/0202054 A1 * | 8/2009 | Wick | 379/114.2 |

* cited by examiner

*Primary Examiner* — Gerald Gauthier

(57) ABSTRACT

In certain embodiments, a system for automated distribution and indexing of prepaid calling card information comprises a central terminal operable to receive a request to purchase prepaid telephone services from an initiating terminal. The request comprises an identifier of a financial account to be used to purchase the prepaid telephone services. The central terminal is operable to electronically seek authorization for the request, initiate electronic debiting of the financial account using the identifier, and log a transaction indicating a purchase of prepaid telephone services in response to receipt of the authorization. The central terminal is operable to initiate electronic transmission, according to purchaser contact information, of calling card information from the central terminal to at least one electronic storage medium for access by a purchaser. The calling card information provides access to the prepaid telephone services instead of using a telephone card or printed receipt to obtain the prepaid telephone services.

20 Claims, 5 Drawing Sheets

PREPAID PHONE SERVICE.vcf                600

BEGIN:VCARD — 602
VERSION:2.1 — 604
N:SERVICE;PREPAID;PHONE — 606
FN:PREPAID PHONE SERVICE — 608
NOTE;ENCODING=QUOTED-PRINTABLE:PIN XXXX-XXXX-XXXX-XXXX=0D=0A — 610
TEL;WORK;VOICE:1-800-XXX-XXXX — 612
EMAIL;PREF;INTERNET:customerservice@phonecompany.com — 614
REV:20071213T150626Z — 616
END:VCARD — 618

FIG. 5

AUTOMATED DISTRIBUTION AND INDEXING OF PREPAID CALLING CARD INFORMATION

TECHNICAL FIELD

The present invention relates generally to prepaid telephone services and more particularly to automated distribution and indexing of prepaid calling card information.

BACKGROUND

Telephone companies or other entities currently sell a physical card product that allows consumers to purchase prepaid phone services, such as long distance time or wireless minutes, in predetermined increments of time, on the respective company's network(s). Consumers often purchase these cards for the convenience of a calling card with the security of a pre-set spending limit. For example, these cards may be the typical plastic cards normally associated with the debit and credit industry or wallet-sized cardboard cards imprinted with personal identification number (PIN) information and dialing instructions. These cards are usually designed to be discarded once the purchased time has been consumed. The value of the card is maintained on the respective telephone company's network system. For purposes of this description, "Company" will refer hereinafter to the specific telephone system carrier on whose network time is to be pre-purchased.

Such prepaid telephone cards are often sold at retail outlets, either over-the-counter or through vending machines. An ordinary retail receipt may be issued for the cards purchased when the cards are purchased over-the-counter. Such receipts give the purchaser no additional information other than that phone cards were purchased, the cost of the card(s) purchased, the date, and, normally, the retailer where the cards were purchased. Automated teller machines (ATMs) and internet-enabled computers may also be used for the distribution and purchase of prepaid phone service. In place of physical cards, a printed receipt containing the information needed to use the calling service may be provided.

SUMMARY

According to certain embodiments of the present invention, disadvantages and problems associated with previous techniques for distributing prepaid calling card information to a purchaser may be reduced or eliminated.

In certain embodiments, a system for automated distribution and indexing of prepaid calling card information comprises a central terminal operable to receive a request to purchase prepaid telephone services from an initiating terminal. The request comprises an identifier of a financial account to be used to purchase the prepaid telephone services. The central terminal is operable to electronically seek authorization for the request, initiate electronic debiting of the financial account using the identifier, and log a transaction indicating a purchase of prepaid telephone services in response to receipt of the authorization. The central terminal is operable to initiate electronic transmission, according to purchaser contact information, of calling card information from the central terminal to at least one electronic storage medium for access by a purchaser. The calling card information provides access to the prepaid telephone services instead of using a telephone card or printed receipt to obtain the prepaid telephone services.

Particular embodiments of the present invention may provide one or more technical advantages. Conventional techniques for acquiring prepaid telephone services, such as the over-the-counter and printed receipt techniques, may have a number of drawbacks. For example, with the over-the-counter technique, a purchaser must find a retail outlet which is open and has calling cards in stock. If a large purchase of telephone network time is desired, many retail outlets in the evening and night do not accept large denomination currency to pay for purchases. The retail outlet typically must maintain and track a secured inventory of cards by number and denomination, and report the sales and number of cards sold to the Company. Such a system is labor-intensive and costly to operate. Moreover, there is considerable expense on behalf of the Company to produce and distribute the cards to the retailers. As another example, the printed receipt technique may suffer drawbacks. Printed materials are often liabilities because of the difficulty in organizing and storing such materials. A receipt containing prepaid telephone service information is easily lost among other pieces of paper. Additionally, even were a purchaser able to overcome the difficulties in organization and storage, a printed receipt is often not susceptible to instant access whenever the purchaser desires to use of prepaid telephone services.

Certain embodiments of the present invention provide easier organization and preservation of calling card information associated with purchased prepaid telephone services. In certain embodiments, the present invention provides for electronic communication and preservation of calling card information in a manner in which the calling card information is readily accessible to a purchaser. In certain embodiments, the present invention provides automated entry of calling card information for prepaid telephone services into a purchaser's contacts application software. In certain embodiments, the present invention may reduce or eliminate the need for a purchaser to obtain and keep track of a physical paper receipt or calling card.

Certain embodiments of the present invention may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present invention and its advantages, reference is made to the following descriptions, taken in conjunction with the accompanying drawings, in which:

FIG. 5 illustrates an example contact file that may be generated for storing prepaid calling card information associated with purchased prepaid telephone services, according to certain embodiments of the present invention.

DESCRIPTION OF EXAMPLE EMBODIMENTS

Figure 1:
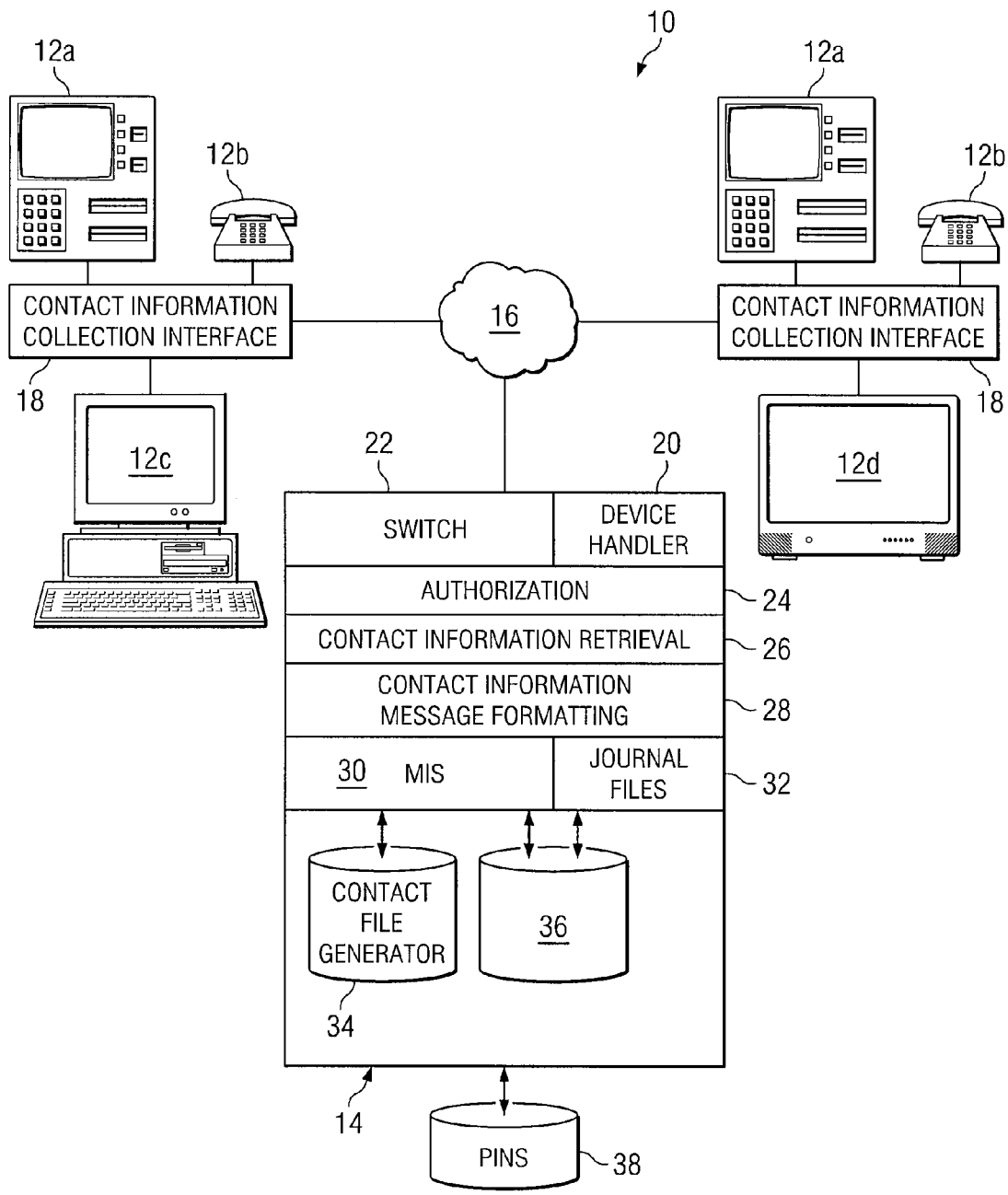
FIG. 1 illustrates an example system for automated distribution and indexing of prepaid calling card information, according to certain embodiments of the present invention.

FIG. 1 illustrates an example system 10 for automated distribution and indexing of prepaid calling card information, according to certain embodiments of the present invention. System 10 includes one or more initiating terminals 12 and a central terminal 14 coupled via a network 16. Although this particular implementation of system 10 is illustrated and primarily described, the present invention contemplates system 10 including any suitable components configured in any suitable manner, according to particular needs. In general, certain embodiments of the present invention electronically transmit calling card information for accessing prepaid telephone services to be used by purchasers in place of current prepaid telephone cards or a printed receipt that includes prepaid calling card information. The prepaid telephone services may include any type of telephone services, including, for example, long distance minutes, mobile phone service, landline minutes, voice over Internet Protocol (VoIP), or any other suitable type of telephone services.

Initiating terminals 12 may include any suitable type of electronic device that can communicate information over network 16 and provide an interface to users of initiating terminals 12 (i.e., purchasers of prepaid telephone services). For example, initiating terminals 12 may include an ATM 12a, wireless or wireline telephone 12b, personal computer 12c, television 12d with input mechanism, or any other suitable electronic device. Although particular initiating terminals are illustrated and primarily described, the present invention contemplates system 10 including any suitable type of electronic initiating terminal outfitted with the capability to access the system services of the present invention. Throughout the remainder of this description, the one or more initiating terminals 12 will be referred to primarily in the singular, but this is for simplicity only and should not be used to limit the present invention.

Central terminal 14 may include one or more electronic computing devices operable to receive, transmit, process, and store data associated with system 10. For example, central terminal 14 may include one or more general-purpose PCs, Macintoshes, workstations, Unix-based computers, server computers, one or more server pools, or any other suitable devices. Although a single central terminal 14 is illustrated, the present invention contemplates system 10 including any suitable number of central terminals 14.

Initiating terminal 12 and central terminal 14 may each include any suitable combination of hardware, firmware, and software. Initiating terminal 12 and central terminal 14 may each include one or more processing units and one or more memory modules. The one or more processing units may include one or more microprocessors, controllers, or any other suitable computing devices or resources. Each memory module may take the form of volatile or non-volatile memory including, without limitation, magnetic media, optical media, random access memory (RAM), read-only memory (ROM), removable media, or any other suitable memory component. In certain embodiments, a memory module comprises one or more databases, such as one or more structure query language (SQL) databases.

Network 16 may include, in any suitable combination, one or more local area networks (LANs), metropolitan area networks (MANs), wide area networks (WANs), radio access networks (RANs), wireless LANs (WLANs), a global computer network such as the Internet, or any other wireline, optical, wireless, or other links. Network 16 may communicate, for example, IP packets, Frame Relay frames, or Asynchronous Transfer Mode (ATM) cells to communicate voice, video, data, and other suitable information between network addresses. Although described in the singular, system 10 may include one or more networks 16.

As a brief overview of an example embodiment, a purchaser desiring to purchase prepaid telephone services may use an initiating terminal 12 to access the system services of the present invention. A purchaser of prepaid telephone services may interact with system 10 via a graphic user interface (GUI) or other suitable interface (e.g., an interactive voice response system) of initiating terminal 12.

At the point where a purchaser places his or her request for purchase of prepaid telephone services, an interface 18 for collecting payment and contact information is provided. Via a keyboard, a keypad, touch-screen, or any other suitable input device, interface 18 collects contact and purchase information, including but not limited to the electronic mail address and telephone number of the purchaser, as well as the card being used to purchase the prepaid telephone services.

Regardless of the initiating terminal 12 selected (i.e., ATM 12a, telephone 12b, personal computer 12c, etc.), the purchaser may use a card to make funds available from a financial account corresponding to the card. Such card may be a credit card, debit card, smart card, stored value card, or any other suitable type of card that is linked to a financial account. At this point, the funds to be transferred may be held or pre-authorized as available and the purchaser's account may be debited. A purchaser's account may also be debited an amount for a customary transaction or convenience fee, if appropriate. For example, a convenience fee may be charged for each prepaid telephone service transaction.

As part of the request, the purchaser may also specify how he or she wishes to receive electronically the calling card information for accessing the purchased prepaid telephone services. For example, a purchaser may specify that he or she would like to receive the information for accessing the purchased prepaid telephone services by short message service (SMS) messaging or text messaging to a mobile phone, email, a contact file for MICROSOFT OUTLOOK or a similar software package, or any other suitable electronic medium or format. In certain embodiments, the purchaser inputs contact information into initiating terminal 12, as part of the request or otherwise. The contact information may include, for example, one or more of a mobile telephone number, e-mail address, the software package (e.g., MICROSOFT OUTLOOK) for receiving a contact file, and any other suitable information.

In certain embodiments, as will be described in more detail below, the purchaser may be able to print a receipt showing the calling card information. Additionally or alternatively, the purchaser receives an electronic transmission that includes calling card information for the purchased prepaid telephone service. The calling card information may include a phone number for accessing ("access number") the prepaid telephone services (e.g., an "800 number"), a PIN, how much time (e.g., minutes) has been purchased, and any other suitable information. The purchaser may call the access number, enter the PIN, and optionally hear a recording telling the purchaser that he or she has a predetermined amount of time to talk, depending on how much time he or she purchased. By following the Company's recorded prompts, the purchaser then dials the destination telephone number he or she wanted to call and begins talking. As there are many ways to carry out purchaser interaction with a Company, and such is beyond the scope of the present invention, it will not be described in further detail.

Embodiments of the present invention can probably best be understood by considering it as two distinct transactions, which will hereinafter be referred to as "requesting" and "dispensing," together forming the overall transaction. Those of ordinary skill in the art will understand considering the initiating terminal 12 as an "issuer" and central terminal 14 as an "acquirer" for purposes of the requesting transaction, as well as considering central terminal 14 as an "issuer" and the initiating terminal 12 as an "acquirer" for purposes of the dispensing transaction. The requesting transaction is preferably portrayed as a withdrawal, or a withdrawal with a convenience charge, as may be the case.

The requesting transaction may be logically considered to include a request to purchase prepaid telephone services, a request for authorization, and an approval (if any). The requesting portion of the overall transaction may begin with a request to electronically purchase prepaid telephone services from an initiating terminal 12. Initiating terminal 12 is the medium a purchaser uses to create the request to electronically purchase the prepaid telephone services. The purchaser may interact with a GUI or other suitable interface (e.g., an interactive voice response system) in order to enter the request. For the sake of the following discussion, and unless otherwise stated, initiating terminal 12 will be an ATM 12*a*. It should be understood that however that any of the initiating terminals ATM 12*a*, telephone 12*b*, personal computer 12*c*, or television 12*d* (or any other suitable initiating terminal 12) could have been used instead. Moreover, initiating terminal 12 may be physically situated anywhere including a convenience store, a grocery store, a post office, a branch of a financial institution, a mall, a residence, or other location.

Initiating terminal 12 preferably permits the transmission of debit or credit card information with the associated PIN encrypted and encoded to ensure security as to the debit or credit card information. This information may be transmitted as part of the request generated at initiating terminal 12, if appropriate. Initiating terminal 12, if not an ATM 12*a* which is customarily deS-secure, preferably is either operable to or is coupled to a device operable to securely encrypt or otherwise securely transmit the information (e.g., the request).

As described above, the requesting portion of the overall transaction may begin with a purchaser's request to electronically purchase prepaid telephone services, such request being generated by initiating terminal 12. Where initiating terminal 12 is an ATM 12*a*, the screen or menu may include the normal transaction options (e.g., withdrawal, balance inquiry, deposit, etc.). However, a purchaser may now also purchase prepaid telephone services by selecting the transaction option to purchase such services. The transaction to purchase prepaid telephone services may be offered in a selection menu as "Company_Name Prepaid Telephone Card," as an example. The purchaser may select the appropriate option from the screen or menu by pressing a button, speaking a command, or touching a screen, depending upon the initiating terminal 12, to interact with system 10.

If the purchaser chooses the prepaid telephone services option, initiating terminal 12 may request, via at least one screen or additional prompt, certain information from the purchaser, such as what denomination of prepaid telephone services is desired to be purchased and the financial account from which such purchase is to be electronically debited. The purchaser may also be informed of any convenience fee to be assessed, if any, to perform the desired transaction. Normally, in the case of an ATM 12*a*, the purchaser has already inserted a card to activate ATM 12*a*. ATM 12*a* may assume that the card corresponds to the financial institution from which the purchaser will pay for the purchase. ATM 12*a* may request whether the purchaser wishes to have the funds taken from the purchaser's checking account, savings account, or another suitable source. The purchaser makes the desired selection. ATM 12*a* transmits the request to purchase prepaid telephone services, together with an identification of the financial account from which the purchaser desires to have funds electronically withdrawn to pay for such purchase, to central terminal 14.

It should be understood that initiating terminal 12 could instead have prompted the purchaser to designate the account to be debited the costs of the transaction before offering the purchaser a screen showing the dollar amounts from which to choose. For purposes of this description, it will be assumed that the dollar amounts of prepaid telephone services are fixed and are in the amounts of $10, $20, and $50. It will be appreciated that such amounts are for illustration purposes only and in no way should be construed to limit the scope of the present invention.

ATM 12*a* may build a Point of Sale ("POS") transaction and pass the POS transaction to a modular device handler 20. Device handler 20 may build a standard transaction message based on the contents of the POS transaction received from ATM 12*a*, and may send the POS transaction message to router/switch 22. In certain embodiments, the standard POS transaction message fields are filled as follows:

Type—"0200"
Transaction type—"44xx00"
[indicating a purchase of goods or services from "xx," where "xx" is the account type]
POS condition code—"14"
[indicating a generic point of sale]
Merchant ID—"Company"
[where "Company" is the actual name of the telephone service provider of the services for which the purchaser wishes to prepay]
Initiating Terminal Dispense Type—
"7" $10 worth of prepaid telephone services dispensed
"8" $20 worth of prepaid telephone services dispensed
"9" $50 worth of prepaid telephone services dispensed
Merchant
Type—"4812"
[indicating that the telephone service/equipment is non-utility, non-regulated]
POS Data Code—"22140121010C"
[Card data input capability "2"—magnetic stripe read
Cardholder authentication "2"—PIN
Card Retention capability "1"—can capture
Operating environment "4"—off premises of terminal owner, unattended
Cardholder present "0"—cardholder present
Card present "1"—card present
Card data input mode "2"—magnetic stripe read
Cardholder authentication "0"—non-authenticated
Cardholder authentication mode "1"—PIN
Security data "0"—no security concern
Pin capture capability "C"—12 characters]
Service Classification Code—"700"
[indicating this transaction is a general purchase of services].

In embodiments in which the standard POS transaction message, populated as described above, is used, initiating terminal 12 may transmit the requested transaction information received from the purchaser by a high-speed dedicated line to central terminal 14. However, networks of any suitable speed may be used for any aspect of the present invention.

Initiating terminal 12 may determine that the subject transaction requires authorization and may send a request for authorization to central terminal 14, thereby entering the next stage of the requesting transaction. Alternatively, central terminal, in response to receiving the request, may determine that authorization is required. For example, in embodiments in which a personal computer 12c is used as the initiating terminal, central terminal may determine that the request requires authorization.

While various implementations will occur to those skilled in the art, in certain embodiments central terminal 14 includes modular device handler 20, switch 22, authorization module 24, contact information retrieval module 26, contact information message formatting module 28, MIS 30, suspended journal files 32, contact file generator 34, and memory module 36. Some of the many types of reports that may be generated include: reconciliation of sold and unsold PINs, account of number of receipts by denomination, summary of total PINs sold, and other suitable reports. A PINs file 38 includes the different denominations of prepaid telephone services that the Company desires to sell (e.g., $10, $20, and $50). PIN numbers stored in PINs file 38 may be live and encrypted.

Switch 22 of central terminal 14 accepts the incoming request from initiating terminal 12 and activates authorization module 24. Authorization module 24 forwards the received request to an authorization agent. Central terminal 14 may have the appropriate links to debit card networks and credit card authorization points to authenticate the card and the financial account information belonging to the purchaser desiring to make the purchase of prepaid telephone services (e.g., as specified in the request). Among the information provided to the authorization agent may be the request for authorization for the principal amount corresponding to the desired level of prepaid telephone services selected by the purchaser (referred herein as the "principal"), together with the appropriate convenience or service fee, if any.

The authorization agent receives the financial information from central terminal 14 and, assuming sufficient funds or credit exists in the referenced account, authorizes the transaction for the full amount of the principal and any convenience fee. It should be understood that the authorization agent may be a financial institution, a card issuer, an intercept processor, a regional/national network, or any other suitable authorization agent. The present invention contemplates permitting customization to allow the participating institutions to set their own approval limits for their purchasers.

As there are numerous known techniques for obtaining authorization, any of which are compatible with the present invention, the actual authorization method carried out by an authorization agent will not be described in more detail herein. Moreover, it should be understood that the platform of central terminal 14 may also be the authorization agent and perform authorization approval with the permission and within the guidelines established by a particular financial institution.

Once the authorization agent returns an approval message to central terminal 14, the requesting transaction has entered the authorization-approved stage. When central terminal 14 receives an approved transaction response, central terminal 14 may write an entry to journal files 32 and log the transaction in memory module 36 for storage, retrieval, and reporting for subsequent research on that data.

In the case of initiating terminal 12 being ATM 12a, this entry correctly represents the transaction, but may not be included in any dollar-dispensed totals accrued to ATM 12a.

If the purchaser selected $50 of prepaid telephone services and an approval is returned from the authorization agent, the transaction is preferably processed as a POS transaction for $50, i.e., for the dispense of one $50 prepaid telephone services. In certain embodiments, no change is made to the standard Regulation E financial transaction receipt.

Figure 2:
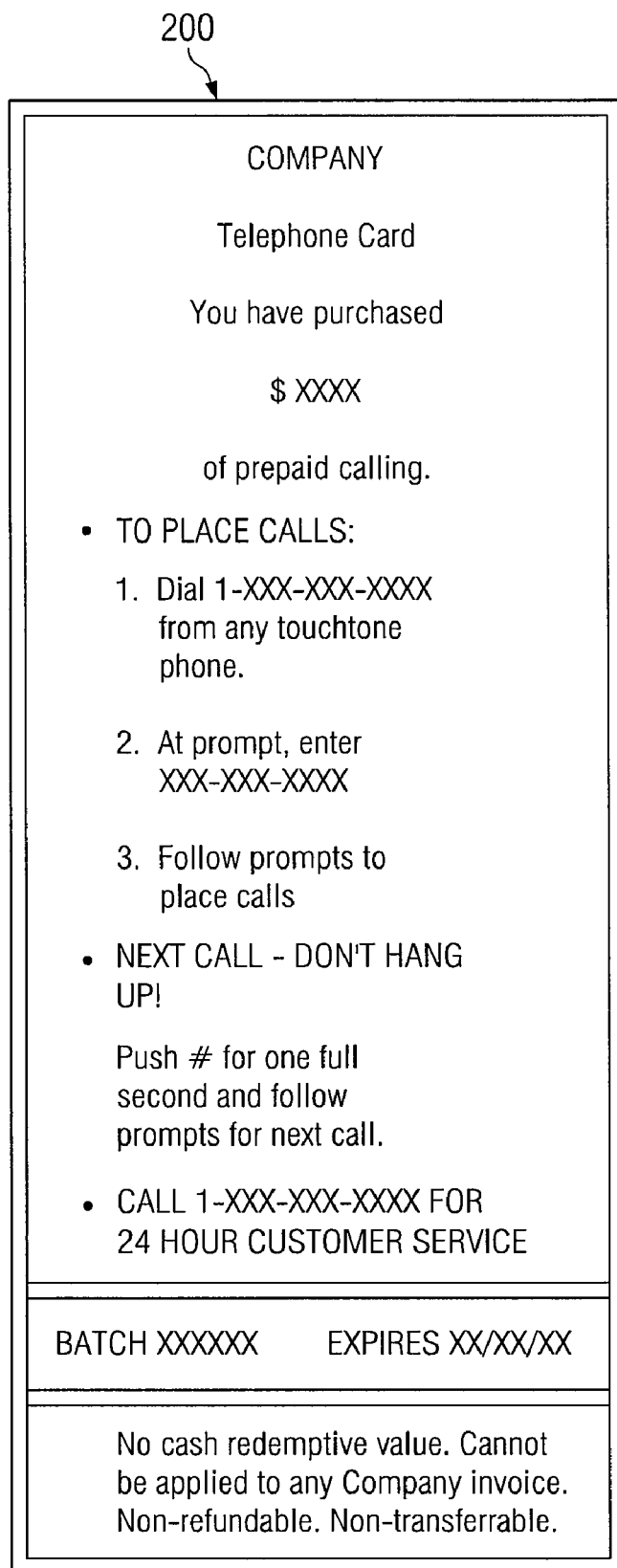
FIG. 2 illustrates an example receipt for prepaid telephone services that may be generated according to certain embodiments of the present invention.

FIG. 2 illustrates an example receipt 200 for prepaid telephone services, according to certain embodiments of the present invention. Among other items, receipt 200 includes a clear, live PIN, the access number to call to access the services paid for (preferably toll-free), any expiration date of the PIN, and instructions for accessing the prepaid telephone services. These elements are taken directly from the TENS, TWENTIES and FIFTIES files, except for the clear PIN. Device handler 20 decrypts the KPE using variant zero of the "known" KKE, then decrypts the PIN using variant zero of the clear KPE.

In certain embodiments, receipt 200 may be printed prior to printing the financial transaction receipt. If the receipt printer of ATM 12a (or another initiating terminal 12) faults before receipt 200 has printed completely, ATM 12a may reverse the transaction. ATM 12a may then substantially immediately report a receipt printer fault. In certain embodiments, the transaction menu item "Prepaid telephone services" will be made unavailable; however, given the ability to electronically transmit the calling card information, this may not be necessary or appropriate. If a reversal occurs, device handler 20 may return the entire record—the encrypted PIN, encrypted KPE, access number, batch number, expiration date, and file key to central terminal 14 for insertion back into the appropriate TENS, TWENTIES or FIFTIES file in PINs file 38.

The second portion of the overall transaction, the dispensing transaction, will now be described. When the transaction response is returned by authorization module 24 to device handler 20 as approved, device handler 20 may format a request to central terminal 14 for the next available PIN in the appropriate TENS, TWENTIES or FIFTIES files of PINs file 38. It should be observed at this point that if the transaction is returned by the authorization agent as not approved, device handler 20 delivers the denial to initiating terminal 12 for communication to the customer, without requesting a PIN from central terminal 14.

Central terminal 14 may returns to device handler 20 a message containing the PIN, the associated KPE, an access number, a batch number, and the file key. Central terminal 14 may delete the record from the TENS, TWENTIES, OR FIFTIES file of PINs file 38. Device handler 20 may transmit the PIN to initiating terminal 12, which in turn prints the PIN on issued receipt 200 for the customer. The PIN can be provided to the customer via a variety of methods, depending upon initiating terminal limitations, but preferably it is provided to the customer on receipt 200. Initiating terminal 12 preferably also issues a separate receipt (standard Regulation E), which itemizes the principal amount transferred to pay for the prepaid telephone services purchased, and the convenience fee charged the customer's account for the transaction, if any, and from which financial account such funds were electronically debited. It should be understood that while two separate receipts may be issued by initiating terminal 12, according to another embodiment of the present invention, initiating terminal 12 issues only one receipt bearing on its face all of the information found on the two separate receipts of the preferred embodiment. In certain embodiments, no receipt is generated by initiating terminal 12.

It should be understood by those skilled in the art that central terminal 14 of the present invention may be accessed from any number of networks 16 with their own initiating terminals and financial institutions with which they are associated. Because of this open design, an initiating terminal 1210, such as ATM 12a, on a different network 16 than central terminal 14 may obtain authorization for and receive a live PIN to be provided to their purchasers.

The Company may be connected to central terminal 14 in any suitable manner. It should also be understood that more than one Company may be supported by system 10, in which case separate PINs files 38 could be maintained for each Company supported.

As needed, new live PINs may be provided by the Company in a file called PINFILE to replenish PINs files 38. In certain embodiments, the length of the PINFILE is 80 bytes. Example file and record layouts for PINFILE are shown below in Table A. Each PIN number may be associated with a set amount of time for prepaid telephone services corresponding to a given denomination shown in receipt 200. Thus, when the Company's system encounters a PIN number, it knows that the encountered PIN number is a $20 PIN number, for example, and responds accordingly.

TABLE A

PINFILE

| Element | Description | Attribute |
|---|---|---|
| PINFILE file header: | | |
| Record type | "H" | 1 A |
| File Replacement Code | "L" or "U" | 1 A |
| File Name | "PINFILE" | 7 A |
| Filler | blank | 65 S |
| Record Number | "000001" | 6 N |
| PINFILE detail record: | | |
| Record type | "D" | 1 A |
| PIN | hex character set, 0-F | 16 AN |
| Filler | blank | 1 S |
| KPE | hex character set, 0-F | 16 AN |
| Filler | blank | 1 S |
| Denomination | "10" or "20" or "50" | 2 AN |
| Filler | blank | 1 S |
| Denomination | "10" or "20" or "50" | 2 AN |
| Filler | blank | 1 S |
| 800# | character set, 0-9 This is the 800 number the purchaser calls - printed on the receipt | 7 AN |
| Filler | blank | 1 S |
| Expiration Date | MMDDYYYY | 8 N |
| Filler | blank | 1 S |
| Batch # | Comp. batch number, right justified, zero filled printed on the receipt | 9 N |
| Filler | blank | 10 S |
| Record Number | sequential within file, right justified, zero filled | 6 N |
| PINFILE trailer record: | | |
| Record type | "T" | 1 A |
| Total Number of $10 Records | count of $10 PINs detail of records | 6 N |
| Total Number of $20 Records | count of $20 PINs detail of records | 6 N |
| Total Number of $50 Records | count of $50 PINs detail of records | 6 N |
| Total Dollars | total $ for all detail records | 6 N |
| Total Record | recount count in file, including header and trailer records | 7 N |
| Filler | blank | 42 S |
| Records Number | sequential within file, right justified, 0 filled | 6 N |

Explanation of Terms for Table A:

Batch #—The Company batch from which the particular PIN has been taken. The batch number may be printed on receipt 200.

Denomination—"10" or "20" or "50" (i.e., the dollar amount associated with the PIN).

File Replacement Code—"L" indicates a full file load, and "U" indicates an update. A full file load should only be performed for the first file sent. All files subsequent to the first file should be updates.

Expiration Date—Preferably assigned by Company, sent in MMDDYYYY format. The expiration date may be printed on receipt 200.

File Name—Constant "PINFILE."

PIN—The encrypted PIN. This is a 16-character hex number resulting when the 10 character clear PIN is encrypted under a Key for PIN Encryption (KPE).

KPE—The encrypted Key for PIN Encryption. This is the key used for encrypting the PIN, encrypted under a Key for Key Encryption (KKE).

Record Number—A sequential number, incremented by 1, associated with the record in the file. The header record may be "000001."

Record Type—Constant "H" for a header record, constant "D" for detail records, or constant "T" for a trailer record.

Total Dollars Represented—Total dollars represented by all detail records.

Total Number of $10 Records—Count of detail records containing $10 PINs.

Total Number of $20 Records—Count of detail records containing $20 PINs.

Total Number of $50 Records—Count of detail records containing $50 PINs.

Total Records—Count of all records in file, including header and trailer records.

800#—This is the last seven digits of the toll-free access number a consumer will call to use the prepaid telephone services reflected by his receipt 200. This number, formatted "800-XXX-XXXX" may be printed on receipt 200.

Central terminal 14 may build three key-sequenced files for storage of the new PINs in PINs files 38, one for each denomination of prepaid telephone services available for purchase: $10, $20, or $50 (i.e., the TENS, TWENTIES, or FIFTIES files described above). Each record may include the encrypted PIN, the key under which the PIN has been encrypted, the expiration date associated with the PIN, the Company batch number from which the PIN has been taken, and the last seven digits of the toll-free access number associated with this PIN. The Key for PIN Encryption (KPE) may be stored encrypted under a Key for Key Encryption (KEK). While the KEK is may be generated by the Company, central terminal 14 may also be adapted to generate the KEK. The KEK value may be input as a run-time parameter to device handler 20, which, as was described earlier, is responsible for the decryption of each PIN as it is removed from PINs files 38 and transmitted to the customer.

In addition to or in place of generating a printed receipt, embodiments of the present invention provide for automatic electronic communication of calling card information to a storage medium for access by the purchaser of the prepaid telephone services. In the dispensing phase, central terminal 14 initiates output of electronic calling card information to a storage medium for access by the purchaser of the prepaid telephone services. For example, central terminal 14 may initiate output of the electronic calling card information to an electronic device associated with the purchaser in response to the purchase of prepaid telephone services. The electronic calling card information may include a portion or all of the information described above with reference to receipt 200. For example, the electronic calling card information may include an access number, a PIN, an expiration date, the amount of prepaid telephone services, instructions for accessing the purchased prepaid telephone services, and any other suitable information. A portion or all of this information may be obtained in a similar manner to that described above with reference to receipt 200.

With previous and existing systems, the purchaser may receive a physical calling card or a physical receipt that includes information for accessing and using the prepaid telephone services. According to certain embodiments of the present invention, prepaid calling card information is automatically sent to the purchaser through one or more electronic mediums. These electronic mediums include, but are not limited to, an SMS or text message, an automated voice message, an email message, an importable contact file, or any other suitable electronic format. The communicated electronic calling card information is communicated to an electronic device of the purchaser (e.g., a mobile phone, personal computer, or other suitable electronic device), and the purchaser can access the electronic credit card information at a later time using the electronic device.

For example, the electronic calling card information may be communicated as an SMS or text message to the purchaser's mobile phone (or a mobile phone designated by the purchaser as part of the request). As another example, the electronic calling card information may be communicated as an automated voicemail message sent to the purchaser's voicemail (e.g., using text-to-speech translation) that can be stored in voicemail archives. As another example, the electronic calling card information may be communicated as an email message to an email account of the purchaser (or an email account designated by the purchaser as part of the request). As another example, the electronic calling card information may be communicated as an importable contact file for MICROSOFT OUTLOOK or another similar contact management software application.

Figure 5:
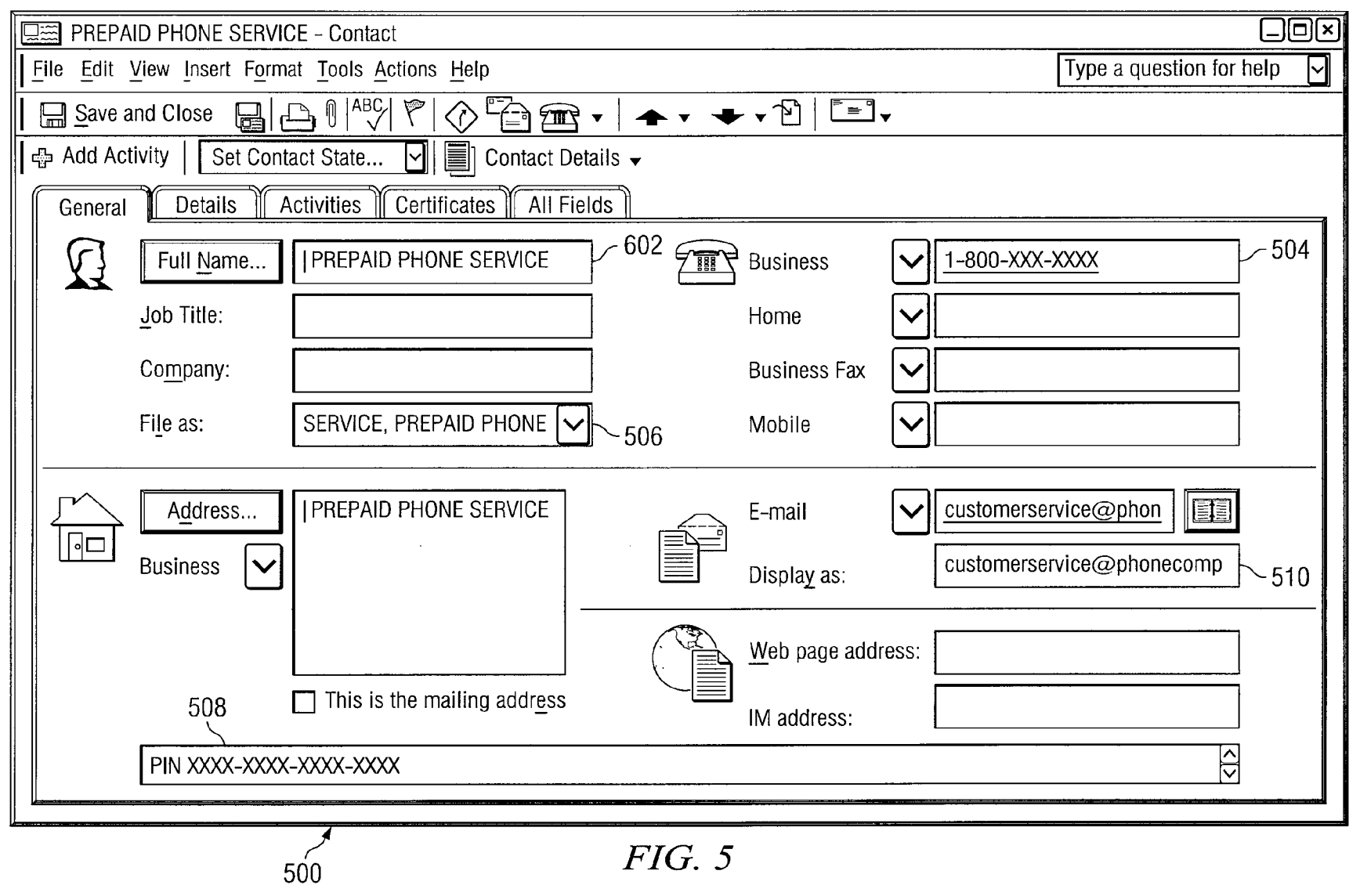

FIG. 5, described in more detail below, illustrates an example contact file that may be generated for storing prepaid calling card information associated with purchased prepaid telephone services, according to certain embodiments of the present invention FIG. 6, described in more detail below, illustrates an example vCard file that may be generated for storing prepaid calling card information associated with purchased prepaid telephone services, according to certain embodiments of the present invention.

In certain embodiments, the electronic prepaid calling card information may be communicated in addition to the printing of a physical receipt that includes calling card information and/or the acquisition of a physical card that includes the calling card information. For example, as described above, central terminal 14 may still communicate calling card information to initiating terminal 12 that enables initiating terminal 12 to print a receipt, if desired.

As described above, central terminal 14 may include a contact file generator 34 that is operable to generate a contact file to be communicated to an electronic device associated with the purchaser for importation into contact management software of the purchaser. The request to purchase prepaid telephone services received by central terminal 14 from initiating terminal 12 may include contact information, such as a purchaser e-mail, phone number, an email program identity, and/or a contact management program identity. Contact file generator 34 may process the information into a "contact" file compatible with the contact management program specified by the purchaser. The contact file is then attached to an email message or other message created by a contact information message formatting module 28 and sent to the user via network 16.

In certain embodiments, during the financial authorization for the purchase of the prepaid telephone services, a contact information retrieval module 26 automatically retrieves purchaser contact information (e.g., an e-mail address and phone number) from account information associated with the purchaser's financial institution. The purchaser contact information and information to access prepaid telephone services may be sent to contact file generator 34 where it is processed into a contact file compatible with the purchaser's contact management application. The contact file is then attached to an email message or other suitable electronic message created by contact information message formatting module 28 and sent to the user via the network 16. In this scenario, it may not be necessary for a user to submit contact information with the request for prepaid telephone services.

The contact file can then be added to the purchaser's contact list in the purchaser's contact management application and "synced" with a mobile phone, blackberry, PDA, or other mobile device so that the purchaser will not have to enter the information to access prepaid telephone services manually. The purchaser may then be able to access the access number, PIN, and dialing instructions virtually instantly via speed dial after the purchaser synchronizes his or her phone with the contact management program.

The desired format or formats for receiving the prepaid phone services information can be specified by the purchaser at initiating terminal 12 or extracted from the account information associated with financial account debited for purchase of the prepaid telephone services.

Particular embodiments of the present invention may provide one or more technical advantages. Conventional techniques for acquiring prepaid telephone services, such as the over-the-counter and printed receipt techniques, may have a number of drawbacks. For example, with the over-the-counter technique, a purchaser must find a retail outlet which is open and has calling cards in stock. If a large purchase of telephone network time is desired, many retail outlets in the evening and night do not accept large denomination currency to pay for purchases. The retail outlet typically must maintain and track a secured inventory of cards by number and denomination, and report the sales and number of cards sold to the Company. Such a system is labor-intensive and costly to operate. Moreover, there is considerable expense on behalf of the Company to produce and distribute the cards to the retailers. As another example, the printed receipt technique may suffer drawbacks. Printed materials are often liabilities because of the difficulty in organizing and storing such materials. A receipt containing prepaid telephone service information is easily lost among other pieces of paper. Additionally, even were a purchaser able to overcome the difficulties in organization and storage, a printed receipt is often not susceptible to instant access whenever the purchaser desires to use of prepaid telephone services.

Certain embodiments of the present invention provide easier organization and preservation of calling card information associated with purchased prepaid telephone services. In certain embodiments, the present invention provides for electronic communication and preservation of calling card information in a manner in which the calling card information is readily accessible to a purchaser. In certain embodiments, the present invention provides automated entry of calling card information for prepaid telephone services into a purchaser's contacts application software. In certain embodiments, the present invention may reduce or eliminate the need for a purchaser to obtain and keep track of a physical paper receipt or calling card.

Figure 3:
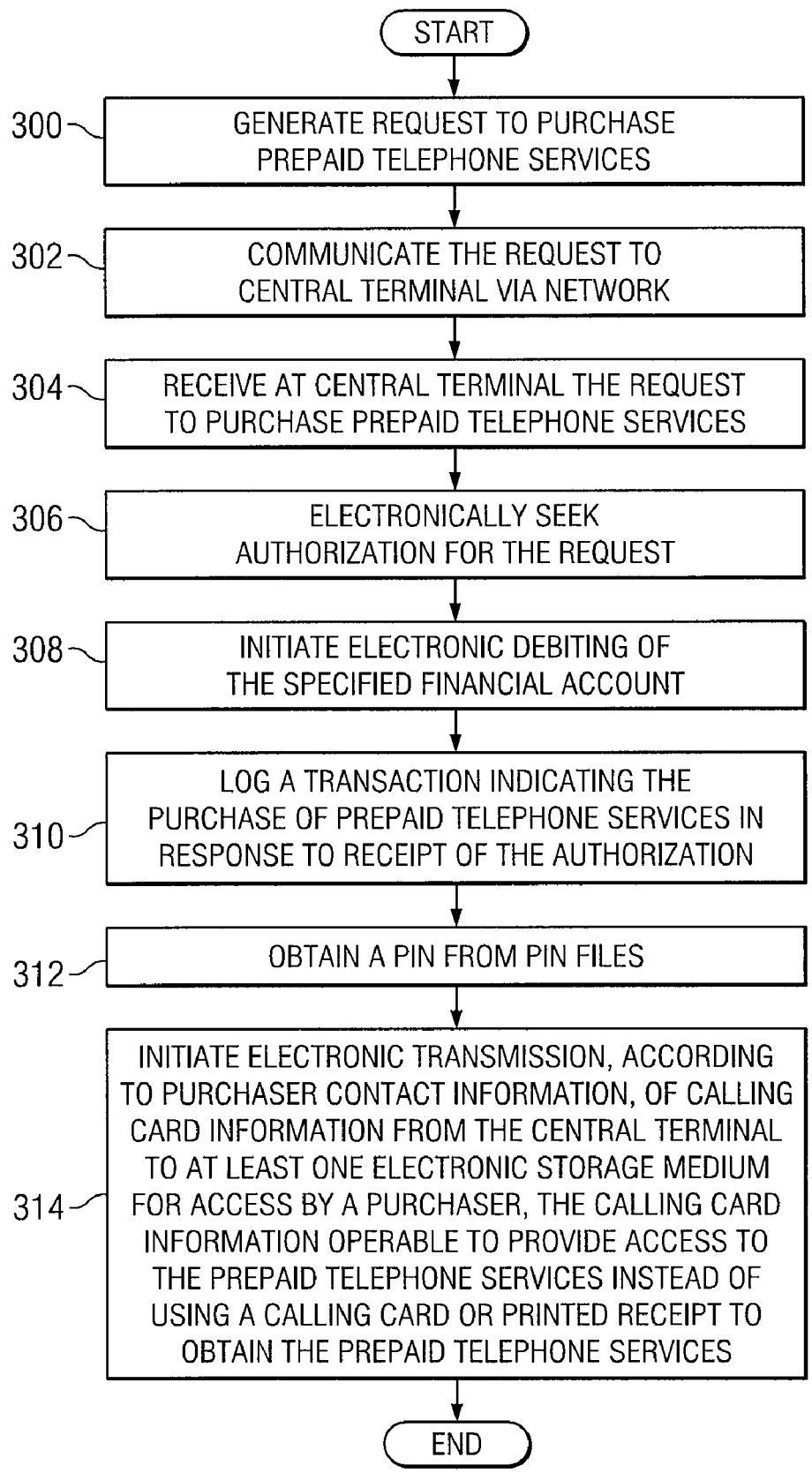
FIG. 3 illustrates an example method for automated distribution and indexing of prepaid calling card information, according to certain embodiments of the invention.

FIG. 3 illustrates an example method for automated distribution and indexing of prepaid calling card information, according to certain embodiments of the present invention. At step 300, initiating terminal 12 may generate a request to purchase prepaid telephone services. For example, a purchaser may interact with initiating terminal 12 to cause initiating terminal 12 to generate the request. In certain embodiments, the purchaser may include in the request an identifier of a financial account to be used to purchase the prepaid telephone services. The financial account is the account from which central terminal 14 is to electronically debit the price of the purchased prepaid telephone services. At step 302, initiating terminal 12 may communicate the request to central terminal 14 via network 16.

At step 304, central terminal 14 may receive the request to purchase prepaid telephone services. As described above, the request may include the identifier of the financial account to be used to purchase the prepaid telephone services. The request may also specify an amount of prepaid telephone services (e.g., a number of minutes and/or a dollar amount) to be purchased. In certain embodiments, the request may also include contact information for the purchaser. This contact information may specify the electronic format in which the purchaser desires to receive the electronic calling card information, a phone number of the purchaser, an email address of the purchaser, an identification of the type of contact management application used by the purchaser, and any other suitable information.

It should be noted that the process of entering the request and central terminal 14 receiving the request may be an interactive process in which the purchaser inputs certain information into initiating terminal 12, central terminal 14 receives the information and requests additional information of the purchaser, the purchaser enters the additional information using initiating terminal 12, and so on.

At step 306, central terminal 14 may electronically seek authorization for the request. For example, central terminal 14 may electronically seek authorization for the purchase from the authorizing agent responsible for the financial account designated by the purchaser in the request. At step 308, if authorization is received, central terminal 14 may initiate electronic debiting of the specified financial account. At step 310, assuming authorization is obtained and the financial account is successfully debited, central terminal 14 may log a transaction indicating the purchase of prepaid telephone services in response to receipt of the authorization. At step 312, central terminal 14 obtains a PIN from PINs files 38.

At step 314, central terminal 14 initiates electronic transmission, according to purchaser contact information, of calling card information from the central terminal to at least one electronic storage medium for access by a purchaser. The calling card information is operable to provide access to the prepaid telephone services instead of using a telephone card or printed receipt to obtain the prepaid telephone services. For purposes of this description, even though the calling card information is operable to provide access to the prepaid telephone services instead of using a telephone card or printed receipt to obtain the prepaid telephone services, a receipt and/or calling card may still be provided to the user in addition to the electronic calling card information being transmitted to at least one electronic storage medium for access by the purchaser.

The electronic calling card information may include a portion or all of the information described above with reference to receipt 200. For example, the electronic calling card information may include an access number, a PIN (i.e., the PIN obtained at step 312), an expiration date, the amount of prepaid telephone services, instructions for accessing the purchased prepaid telephone services, and any other suitable information. A portion or all of this information may be obtained in a similar manner to that described above with reference to receipt 200. It should be understood that the PIN and calling instructions may be sent via contact file, e-mail, voicemail, SMS, or other similar electronic format to the purchaser. In certain embodiments, a regular printed receipt may also be obtained at initiating terminal 12, if appropriate.

If a contact file is the desired electronic format, contact file generator 34 may generate a contact file to be communicated to an electronic device associated with the purchaser for importation into contact management software of the purchaser. The request to purchase prepaid telephone services received by central terminal 14 from initiating terminal 12 may include contact information, as described above. Contact file generator 34 may process the information into a contact file compatible with the contact management program specified by the purchaser. The contact file is then attached to an email message or other message created by a contact information message formatting module 28 and sent to the user via network 16.

Alternatively, during the financial authorization for the purchase of the prepaid telephone services, a contact information retrieval module 26 automatically retrieves purchaser contact information (e.g., an e-mail address and phone number) from account information associated with the purchaser's financial institution. The purchaser contact information and information to access prepaid telephone services may be sent to contact file generator 34 where it is processed into a contact file compatible with the purchaser's contact management application. The contact file is then attached to an email message or other suitable electronic message created by contact information message formatting module 28 and sent to the user via the network 16. In this scenario, it may not be necessary for a user to submit contact information with the request for prepaid telephone services.

The contact file can then be added to the purchaser's contact list in the purchaser's contact management application and "synced" with a mobile phone, blackberry, PDA, or other mobile device so that the purchaser will not have to enter the information to access prepaid telephone services manually. The purchaser may then be able to access the access number, PIN, and dialing instructions virtually instantly via speed dial after the purchaser synchronizes his or her phone with the contact management program.

Figures 4, 6:
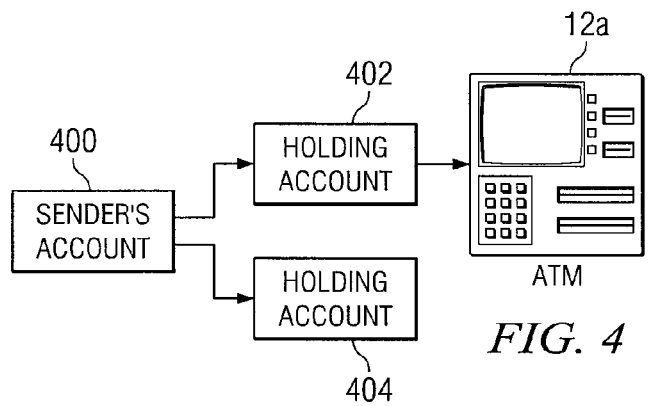
FIG. 4 illustrates an example principal and fee transfer, according to certain embodiments of the present invention.
FIG. 6 illustrates an example vCard file that may be generated for storing prepaid calling card information associated with purchased prepaid telephone services, according to certain embodiments of the present invention.

FIG. 4 illustrates an example principal and fee transfer, according to certain embodiments of the present invention. Upon receipt of the approval message, which amounts to approval of the authorization request and reflects the fact the purchaser does in fact have sufficient funds available, central terminal 14 "withdraws" the money from the purchaser's account 400 and credits holding account 402. Central terminal 14 may also credit holding account 404 with a convenience fee, if any. The transaction is normally settled on a predetermined basis among the parties owning the pieces of the system responsible for carrying out the overall transaction. The distribution of the settlement is preferably a batch process.

As is the normal business practice within the electronic funds transfer (EFT) industry, once system 10 has received an authorization approval message, the relevant financial institution has committed to reimburse the owner of initiating terminal 12 (which in the example illustrated in FIG. 4 is shown as ATM 12a) that will, in effect, be advancing funds on the purchaser's behalf when initiating terminal 12 outputs data for prepaid telephone services to the purchaser. Thus, the authorization approval is a guarantee on the part of the issuing institution that the acquiring institution will be reimbursed. For this reason, system 10 can complete the overall transaction even in advance of actually getting the funds from the institution.

FIG. 5 illustrates an example contact file 500 that may be generated for storing prepaid calling card information associated with purchased prepaid telephone services, according to certain embodiments of the present invention. As a particular example, contact file 500 may be a contact file for MICROSOFT OUTLOOK. However, the present invention contemplates contact file 500 being in any suitable format for any suitable contact management application.

The contact information of contact file 500 may include one or more of the name of the phone service provider or another description of the contact 502, the dialing string 504 (e.g., the access number) to dial to access the prepaid phone service, how the contact is filed under Outlook 506, the PIN 508 for accessing the prepaid phone service, and an e-mail contact 510 for the Company's customer service department. Additionally or alternatively, dialing string 504 to access the prepaid phone service may include PIN 508. Contact file 500 may include any other suitable information, according to particular needs. Such information could be included in a notes block of contact file 500, for example.

FIG. 6 illustrates an example vCard file 600 that may be generated for storing prepaid calling card information associated with purchased prepaid telephone services, according to certain embodiments of the present invention. For example, vCard file 600 may be format such that MICROSOFT OUTLOOK or another contact management application can read to add a contact according to the vCard file. In certain embodiments, vCard file 600 is a text file. VCard file 600 may include an identifier 602 that informs the contact management application that vCard file 600 includes information for a vCard. A version number 604 informs the contact management application of the version of vCard file 600. Field N 606 identifies how the contact associated with vCard file 600 should be stored in a contact list of the contact management application. Field FN 608 identifies the full name of the Company.

A notes field 610 of vCard 600 may include any suitable information, such as a PIN, additional instructions that the Company may wish to provide to the purchaser, the amount of prepaid telephone services purchased, the expiration date of the prepaid telephone services (if any), an electronic receipt of the purchase transaction may be provided, or any other suitable information.

A dialing string (e.g., access number) 612 to dial to access prepaid telephone services may be provided as a work contact, but may be provided in the number for home or mobile, if appropriate. In certain embodiments, a PIN may be appended onto dialing string 612 so that the purchaser does not have to input the PIN upon dialing the number to access prepaid telephone services.

Optionally, an email address 614 of the customer service department of the Company may be provided. A Rev field 616 may indicate the time vCard 600 was generated. An End field may identify to the contact management application the end of vCard file 600.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system for automated distribution and indexing of prepaid calling card information, comprising:
a central terminal operable to:
receive a request to purchase prepaid telephone services from an initiating terminal, wherein the request comprises an identifier of a financial account to be used to purchase the prepaid telephone services and purchaser contact information;
electronically seek authorization for the request;
initiate electronic debiting of the financial account using the identifier;
log a transaction indicating a purchase of prepaid telephone services in response to receipt of the authorization; and
initiate electronic transmission, according to the purchaser contact information, of calling card information from the central terminal to at least one electronic storage medium for access by a purchaser, the calling card information operable to provide access to the prepaid telephone services instead of using a telephone card or printed receipt to obtain the prepaid telephone services.

2. The system of claim 1, wherein the central terminal is operable to extract the purchaser contact information from account information associated with the financial account debited for purchase of the prepaid telephone services.

3. The system of claim 1, wherein the the central terminal is operable to determine the purchaser contact information from the request.

4. The system of claim 1, wherein the calling card information is transmitted electronically via SMS messaging, wherein a number for an SMS receiving device is comprised within the purchaser contact information.

5. The system of claim 1, wherein the calling card information is transmitted electronically in the form of a contact file, the contact file formatted according to a contact application.

6. The system of claim 1, wherein the calling card information is transmitted electronically via e-mail, wherein an e-mail address is comprised within the purchaser contact information.

7. The system of claim 1, wherein the calling card information is transmitted electronically to a text-to-speech converter for distribution to the purchaser via voice messaging.

8. A method for automated distribution and indexing of prepaid calling card information, comprising:
receiving from an initiating terminal a request to purchase prepaid telephone services, the request having been generated by the initiating terminal and comprising an identifier of a financial account to be used to purchase the prepaid telephone services and purchaser contact information;
electronically seeking authorization for the request;
initiating electronic debiting of the financial account using the identifier;
logging a transaction indicating a purchase of prepaid telephone services in response to receipt of an authorization; and
initiating electronic transmission, according to the purchaser contact information, of calling card information to at least one electronic storage medium for access by a purchaser, the calling card information operable to provide access to the prepaid telephone services instead of using a telephone card or printed receipt to obtain the prepaid telephone services.

9. The method of claim 8, comprising extracting the purchaser contact information from account information associated with the financial account debited for purchase of the prepaid telephone services.

10. The method of claim 8, wherein:
the method comprises determining the purchaser contact information from the request.

11. The method of claim 8, wherein initiating electronic transmission of the calling card information comprises initiating electronic transmission of the calling card information via SMS messaging, wherein a number for an SMS receiving device is comprised within the purchaser contact information.

12. The method of claim 8, wherein initiating electronic transmission of the calling card information comprises initiating electronic transmission of the calling card information in the form of a contact file.

13. The method of claim 8, wherein initiating electronic transmission of the calling card information comprises initiating electronic transmission of the calling card information via e-mail, wherein an e-mail address is comprised within the purchaser contact information.

14. The method of claim 8, wherein initiating electronic transmission of the calling card information comprises initiating electronic transmission of the calling card information to a text-to-speech converter for distribution to the purchaser via voice messaging.

15. The method of claim 8, further comprising:
receiving an identifier of a financial account to be used to purchase the prepaid telephone services; and causing, using a central terminal, the electronic debiting of the financial account using the identifier.

16. A computer-usable storage medium having instructions embodied therein that when executed cause a computing system to perform a method for automatically distributing and indexing prepaid calling card information, said method comprising:

receiving from an initiating terminal, a request to purchase prepaid telephone services, the request having been generated by the initiating terminal and comprising an identifier of a financial account to be used to purchase the prepaid telephone services and purchaser contact information;
electronically seeking authorization for the request;
initiating electronic debiting of the financial account using the identifier;
logging a transaction indicating a purchase of prepaid telephone services in response to receipt of the authorization; and
initiate electronic transmission, according to the purchaser contact information, of calling card information to at least one electronic storage medium for access by a purchaser, the calling card information operable to provide access to the prepaid telephone services instead of using a telephone card or printed receipt to obtain the prepaid telephone services.

17. The computer-usable storage medium of claim 16, wherein the operations comprising extracting the purchaser contact information from account information associated with the financial account debited for purchase of the prepaid telephone services.

18. The computer-usable storage medium of claim 16, wherein initiating electronic transmission of the calling card information comprises initiating electronic transmission of the calling card information via SMS messaging, wherein a number for an SMS receiving device is comprised within the purchaser contact information.

19. The computer-usable storage medium of claim 16, wherein initiating electronic transmission of the calling card information comprises initiating electronic transmission of the calling card information in the form of a contact file.

20. The computer-usable storage medium of claim 16, wherein initiating electronic transmission of the calling card information comprises initiating electronic transmission of the calling card information via e-mail, wherein an e-mail address is comprised within the purchaser contact information.

* * * * *

UNITED STATES PATENT AND TRADEMARK OFFICE
CERTIFICATE OF CORRECTION

| | | |
|---|---|---|
| PATENT NO. | : 8,213,585 B2 | Page 1 of 1 |
| APPLICATION NO. | : 12/027481 | |
| DATED | : July 3, 2012 | |
| INVENTOR(S) | : Corey W. Wick | |

It is certified that error appears in the above-identified patent and that said Letters Patent is hereby corrected as shown below:

In column 16, line 32, in Claim 3, delete "the the" and insert -- the --, therefor.

Signed and Sealed this
Eighth Day of January, 2013

David J. Kappos
*Director of the United States Patent and Trademark Office*